May 31, 1932.  C. J. COBERLY  1,861,113
APPARATUS FOR HANDLING PIPE
Filed Feb. 4, 1930  4 Sheets-Sheet 1

INVENTOR:
CLARENCE J. COBERLY,
BY

ATTORNEY.

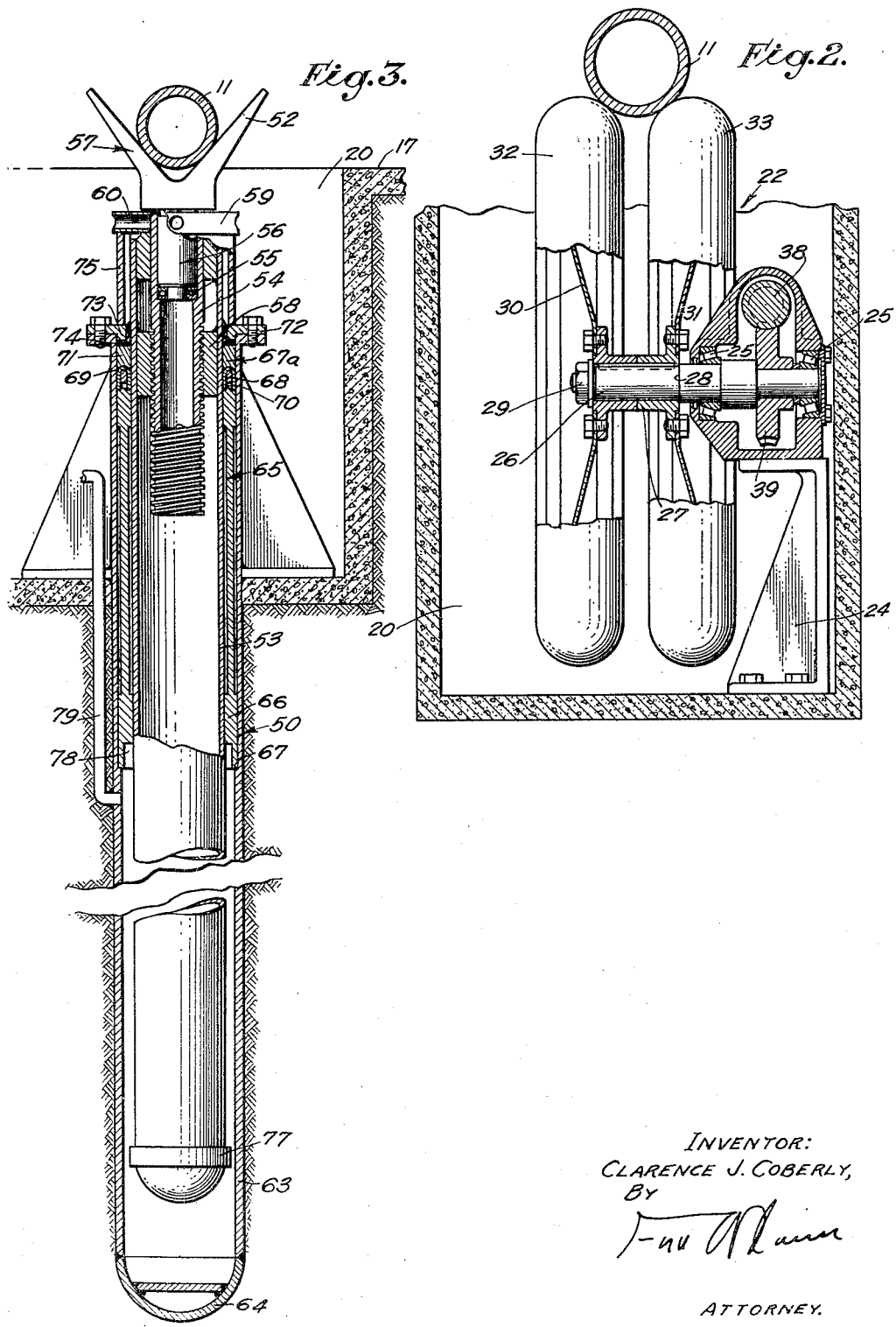

May 31, 1932.  C. J. COBERLY  1,861,113
APPARATUS FOR HANDLING PIPE
Filed Feb. 4, 1930   4 Sheets-Sheet 3
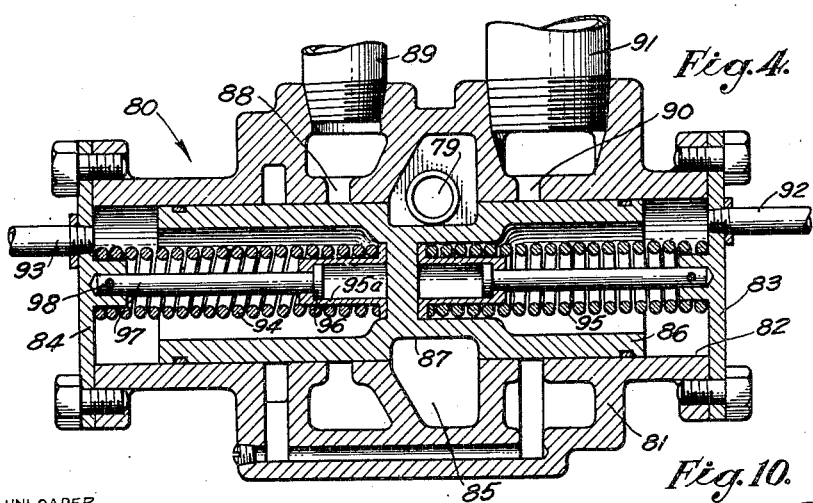
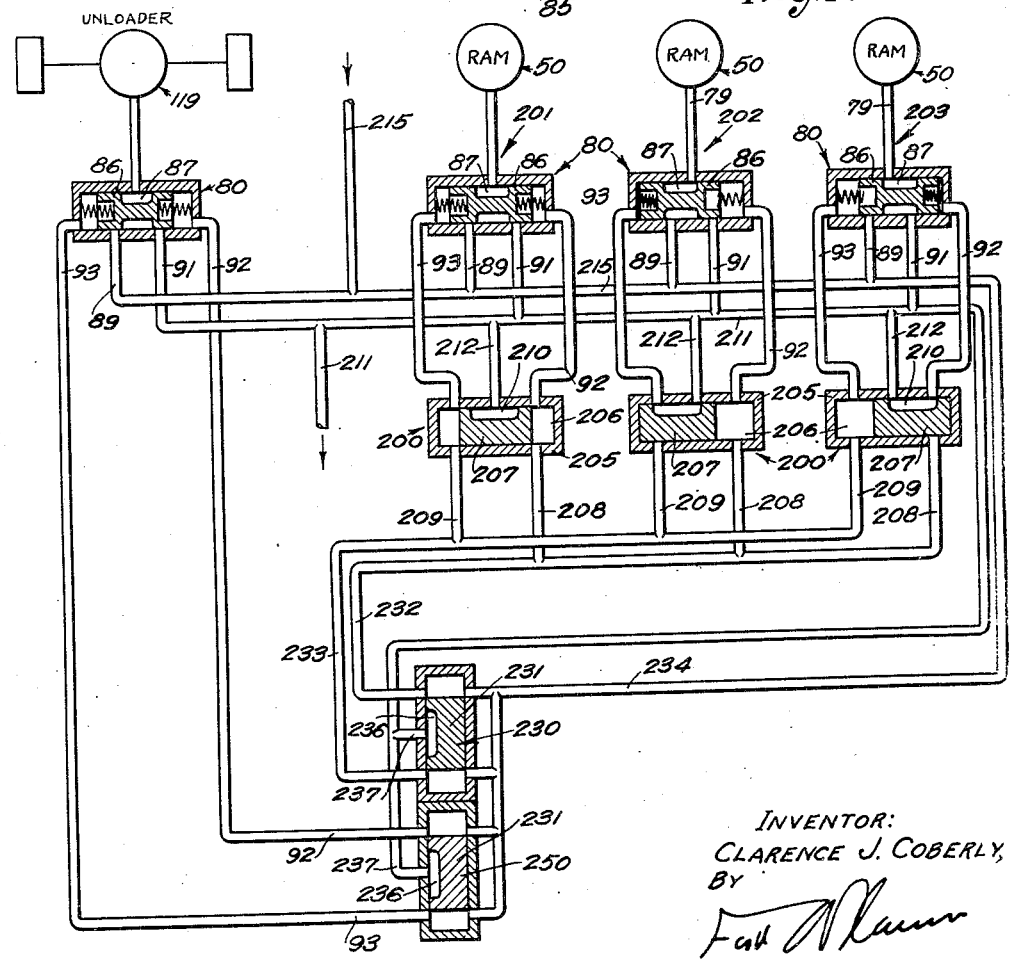
INVENTOR:
CLARENCE J. COBERLY,
BY
ATTORNEY.

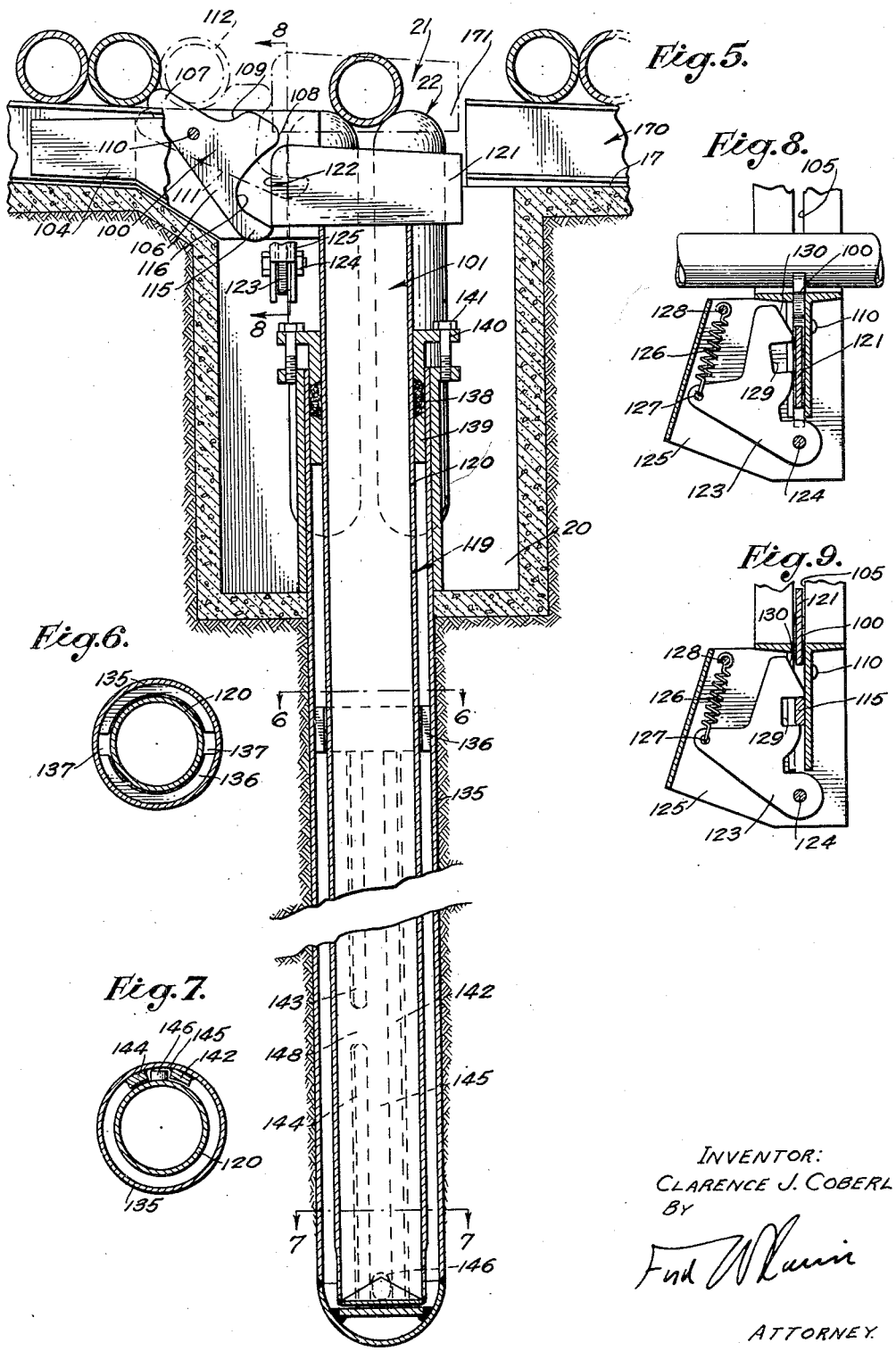

Patented May 31, 1932

1,861,113

UNITED STATES PATENT OFFICE

CLARENCE J. COBERLY, OF LOS ANGELES, CALIFORNIA, ASSIGNOR TO KOBE, INC., OF HUNTINGTON PARK, CALIFORNIA, A CORPORATION OF CALIFORNIA

APPARATUS FOR HANDLING PIPE

Application filed February 4, 1930. Serial No. 425,836.

My invention relates to equipment for handling lengths of pipe or similar articles, and finds particular utility in combination with a pipe-perforating machine described in my copending application filed Feb. 4, 1930, Serial No. 425,837. The present invention is not, however, limited to use with such a machine, but finds utility in various capacities where it is desirable to move lengths of pipe or similar articles from one position to another.

It is an object of my invention to provide a handling equipment which eliminates the use of overhead cranes for transporting lengths of material to and from the machine.

A further object of this invention is to provide a handling equipment which includes a conveying means positioned near or below the surface of the floor, and which moves the length of material toward or away from the machine where it is to be processed.

Still a further object of the invention is to advance such a length of material toward the machine at one level and to subsequently raise it into working position at another level, and also to accomplish this by control means located at a remote point.

Another object of the invention lies in the provision of a novel conveyor means, and a novel jack means for lifting lengths of material therefrom.

A further object of the invention is to provide a novel loading and unloading means for the conveyor system, and in its preferred form, the invention embodies the interconnecting of these means so that the operation of one controls the operation of the other.

It is desirable to place the lengths of material on a primary supporting surface or deck means, and from there transfer these lengths to a conveyor means and later to a secondary supporting surface, the conveyor means being positioned between the primary and secondary surfaces, and it is an object of this invention to provide a structure in which this is made possible.

Certain features of this structure are not limited to a combination including a conveyor means, and it is an object of this invention to provide a novel apparatus for moving a plurality of lengths of material from a primary supporting surface, one at a time, into a space where a jack means is positioned, this jack means moving each length of material to a secondary supporting surface before a new length of material reaches this space.

Further objects of the invention lie in the novel construction of certain of the details of my apparatus, such as the novel form of jack, preferably hydraulically operated, a novel form of conveyor element including pneumatically tired wheels, a novel control system for the jacks, and novel forms of valves for use with such a system.

Referring to the drawings,—

Fig. 2 is a view partially broken away of one of the conveyor elements of my invention, and is taken as indicated by the lines 2—2 of Fig. 1.

Fig. 3 is a sectional view of one of the jacks of my invention taken on the line 3—3 of Fig. 1.

Fig. 4 is a sectional view illustrating a valve structure utilized for operating the jacks.

Fig. 5 is a sectional view of another form of jack utilized in the unloading system of my invention.

Figs. 6, 7 and 8 are sectional views taken on corresponding lines of Fig. 5.

Fig. 9 is a view similar to Fig. 8 and illustrates the latch means of my invention in a different position.

Fig. 10 is a pipe-line diagram illustrating diagrammatically the operation of the jack means of my invention.

Figure 1:
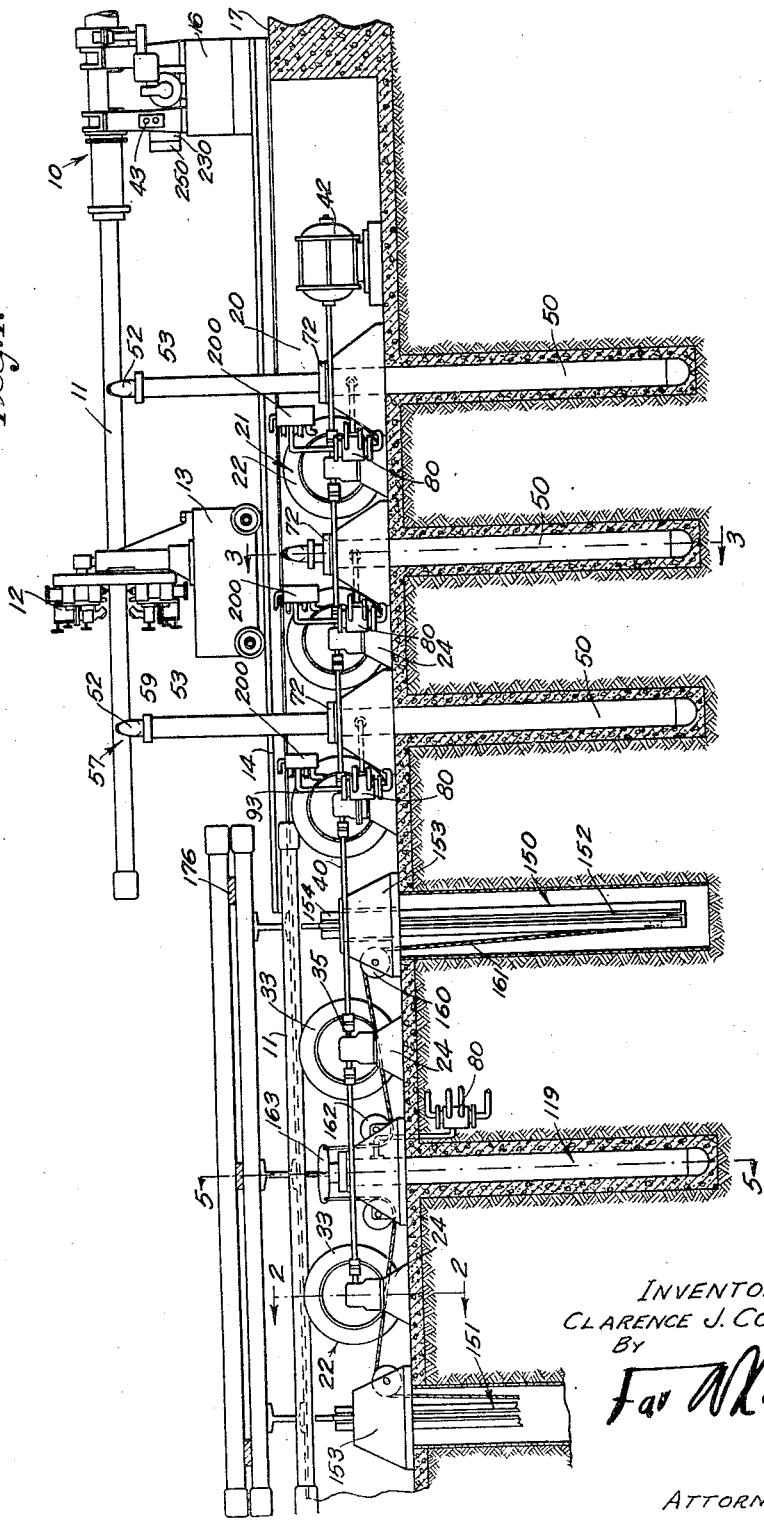
Fig. 1 is a utility view illustrating my apparatus in combination with a pipe-perforating machine.

Referring particularly to Fig. 1, I have diagrammatically shown a machine 10 for processing a length of pipe when this pipe is in a position indicated by the numeral 11, this pipe being thus at a primary level. The details of this machine are shown and described in my copending application, supra, this machine serving to perforate the length of pipe by suitable perforating means 12 mounted on a carriage 13 which is movable along rails 14, so that the carriage may traverse the whole length of pipe and move toward and away from the head 16 of the machine 10. The rails 14 rest on the floor, the level of which is indicated by the numeral 17.

Formed between the rails 14 and below the level 17 is a relatively long pit 20 in which is mounted a conveyor means 21 formed of a plurality of conveyor elements 22 which serve to longitudinally move a length of pipe, this pipe travelling therealong at a secondary level which is near the floor level 17 and preferably below the carriage 13.

Each of the conveyor elements is of substantially the same construction, and the details thereof are best illustrated in Fig. 2. Referring to this figure, each conveyor element includes a base 24 secured in the pit 20 and mounting a pair of bearings 25 which journal a horizontal shaft 26. A hub 27 formed in two similar sections surrounds this shaft, these sections being clamped together and against a shoulder 28 of the shaft 26 by means of a nut 29 threaded to the end of the shaft. Secured to these hub sections are wheels 30 and 31 which may be of the well known disc type utilized on automobiles and which are adapted to mount pneumatic tires 32 and 33. A length of pipe is adapted to rest on these tires in a position shown in Fig. 2 and be conveyed therealong in succession when the wheels are rotated. Such pneumatic tires convey the pipe therealong quietly and without danger of damage to any threaded portions thereof, and also handle pipe having collars threaded thereon.

Each of the conveyor elements is driven through a shaft 35 suitably journalled in the base 24 at right angles to the axis of the shaft 26, and providing a worm 38 thereon which is meshed with a worm gear 39 secured to the shaft 26. The shafts 35 are suitably connected together through connecting shafts 40, best shown in Fig. 1, and are simultaneously driven by a motor 42 which is controlled by a switch 43 mounted on the head 16. This motor is preferably of the reversible type, so that the direction of rotation of the conveyor elements may be controlled from the head 16.

The length of pipe is elevated from the secondary level to the primary level by means of plurality of jacks 50 extending downward through the bottom wall of the pit 20 and positioned between adjacent conveyor elements 22. These jacks may be of any desired type in which a head thereof moves upward into engagement with the length of pipe when at the secondary level, these jacks being preferably capable of individual or simultaneous operation.

The preferred form of jack, illustrated in Fig. 3, provides a head 52 of Y shape adapted to receive the pipe, this head being adjustably mounted on a piston 53 through the medium of a hollow leg 54 which retains a bearing 55 for taking the thrust on a shank 56 which is journalled in this leg, this shank cooperating with the head 52 in forming a pipe-supporting member 57. The lower end of the hollow leg 54 is externally threaded through a shoulder 58 welded in the piston 53 so that a relative rotation between the leg 54 and the piston moves the pipe-supporting member 57 toward or away from the body of the piston 53. This movement of the leg 54 is made possible by a ring 59 secured thereto and positioned just below the head 52 and providing openings 60 adapted to receive a suitable tool for the turning thereof.

The piston 53 is closed at its lower end, and is adapted to slide vertically in a shell 63, the lower end of which is closed by a cap 64. The piston 53 is smaller in diameter than the shell 63 so as to provide an annular space therebetween in which space is positioned a guiding-and-sealing means 65. This means provides a relatively long guide member 66, the lower end of which rests against a shoulder 67 defined at the bottom of a counterbore formed in the shell 63. The upper and lower ends of this guide member are of a diameter only slightly larger than the external diameter of the piston so as to journal this piston in its vertical movement.

It is not only essential that the piston 53 slide in fluid-tight relationship with the shell 63, but also that no abrasive particles shall enter between the engaging surfaces of the guide member 66 and piston 53. To insure these results, I have provided a sealing means 67a forming a part of the means 65. The details thereof are best shown in Fig. 3 wherein I have illustrated an upward extending flange 68 formed on the upper end of the guide member 66, and over which is bent a U-shaped packing member 69 formed of leather or other flexible material, one leg of this member engaging the surface of the piston 53 and the other leg engaging the internal wall of the shell 63. A plurality of holes 70 are formed through this flange, these holes communicating between opposite legs of the packing member 69 so that any fluid in these openings exerts an outward force on these legs.

Positioned above this packing member, and providing a lower arcuate face corresponding in shape to the upper surface thereof, is a follower ring 71 which is forced downward to compress the packing member 69 and retain the guide member 66 in place by means of a plate 72 having a portion 73 extending into the annular space between the piston and the shell. I prefer to position an annular packing member 74 between this portion 73 and the follower ring 71, this packing ring having an upturned portion held between the plate 72 and the external surface of the piston 53 so as to prevent any foreign particles from working downward between the piston and the follower ring 71. In addition, I prefer to utilize an annular skirt 75 secured to and extending downward from the ring 59 in a manner to surround the piston 53, this skirt not only shielding the packing member 74 from abrasive particles when in a lower position, but also providing a stop means for limiting the downward movement of the piston 53.

The upward movement of the piston 53 is controlled by an annular ring 77 secured to the lower end of the piston 53 and adapted to move into a corresponding annular channel 78 formed in the lower end of the guide member 66. This annular channel is only slightly larger in diameter than the annular ring 77 so that as the ring moves thereinto a strong dash-pot action takes place due to the entrapping of liquid in this channel, which liquid must be displaced around the annular ring as this ring moves upward therein.

This movement of the piston 53 relative to the shell 63 is preferably obtained through hydraulic means, the water, or other liquid, entering the shell 63 through a pipe 79 which extends to a valve structure 80, best illustrated in Fig. 4. One of these valve structures is provided for each of the jacks 50, as best shown in Fig. 1, but inasmuch as these structures are identical only one will be described in detail.

Referring particularly to Fig. 4 each of the valve structures includes a body 81 providing a bore 82 therein, the ends of this bore being closed by plates 83 and 84. Formed centrally in the body is a chamber 85 opening on the bore 82 and communicating directly with the interior of the shell 63 through the pipe 79. Adapted to slide in the bore 72 is a piston 86 providing a central pocket 87 which opens on the chamber 85 when the piston is in a neutral position shown in Fig. 4. If this piston is moved to the left a sufficient distance so that it contacts the plate 84, the pocket 87 connects a passage 88 with the chamber 85, this passage 88 communicating with an intake pipe 89 for supplying water to the chamber 85 and to the shell 63 in a manner to raise the piston. When, however, the piston 86 is moved to the right a sufficient distance so that it contacts the plate 83, the pocket 87 inter-connects the chamber 85 and an outlet passage 90 which is in communication with an outlet pipe 91, thus allowing the weight of the piston and the pipe supported thereby to force the water from the shell 63.

The piston 86 is adapted to be moved by hydraulic pressure supplied to the ends thereof. If it is desired to move the piston to the left, for instance, water is forced into the right end of the bore 82 through a pipe 92, while if the piston is to be moved in a rightward direction water is supplied to the left end of the piston through a pipe 93.

The piston is normally returned to the neutral position shown in Fig. 4 by means of two springs 94 and 95. The spring 94 is compressed between the plate 84 and a retainer 95a, this retainer receiving a head 96 of a rod 97 secured to the plate 84 by a pin 98. It will thus be seen that if the piston 86 is moved to the left the spring 94 is compressed, the head 96 sliding in the retainer 95a at this time, but if moved to the right from its neutral position shown in Fig. 4, the retainer 95a is prevented from following the piston 86 rightward through the action of the rod 97. A similar retainer and rod are used in conjunction with the spring 95. It will thus be seen that to displace the piston 86 from this neutral position it is necessary to exert a force thereon sufficient to overcome the pressure of the spring toward which the piston is moving, rather than to exert a force thereon which is only equal to the difference in forces exerted on the piston by the springs 94 and 95. This action is very desirable, even though it requires a greater pressure to move the piston, for it insures a quicker and more positive return of the piston to a neutral position when the hydraulic pressure through the pipes 92 or 93 is relieved.

Lengths of pipe are placed one at a time on the conveyor means 21, and later removed therefrom, by means of loading and unloading means 100 and 101, best illustrated in Figs. 1, 5, 6, 7, 8 and 9. The former means is associated with a primary sloping deck structure 104 adapted to support a number of lengths of pipe which move therealong through the action of gravity and which are adapted to be moved onto the conveyor means 21, one at a time, through the action of the loading means 100.

The deck structure 104 is preferably formed of a plurality of structural steel members extending perpendicularly to the longitudinal axis of the pit 20, and the center of these structural steel members is formed of a pair of angle-irons secured to each other in spaced relationship so as to provide a vertical channel 105 therebetween, as best shown in Figs. 8 and 9.

Positioned in this channel is a stop member 106, formed as best illustrated in Fig. 5, and providing a heel 107 and a head 108 between which is provided a socket 109. The stop member is pivoted in the channel 105 by a pivot pin 110 mounted in the angle-irons and extending through the stop member at a section between the heel 107 and the head 108, so that when the stop member is pivoted therearound, the heel and head alternately rise above the top of the deck structure. When the stop member is in its full line position indicated in Fig. 5, the heel 107 extends upward and into the path of travel of the lengths of pipe to prevent a rolling thereof, but when the stop member assumes a position indicated by dotted lines 111 the heel no longer hinders this rolling movement and the lengths of pipe roll downward, the lowermost pipe being stopped by the head 108 and being in the position indicated by dotted lines 112 of Fig. 5. When the heel 107 is again moved upward a length of pipe previously occupying the position shown by dotted lines 112 is permitted to roll downward and onto the conveyor means 21. The stop member 106 also provides a tongue 115 on the opposite side of the pivot pin 110 from the heel 107, this tongue cooperating with the head 108 in defining a channel 116.

The movement of the stop member 106 is controlled by the vertical movement of a hydraulically operated jack 119 providing a vertically movable piston 120 as shown in Fig. 5. Secured to the upper end of the piston 120 is a blade 121 having an inclined upper surface, this blade cooperating with the remainder of the jacks 119 in forming the unloading means 101 of my invention. One end of this blade extends into the channel 105 and when moved upward therein contacts the head 108 and moves the stop member 106 into its dotted line position 111, at which time the head 108 engages an edge 122 of the blade 121. During this pivoting of the stop member 106 the tongue 115 moves under the lower edge of the blade 121.

It is desirable to be able to move the blade 121 vertically upward into such a position that the head 108 no longer engages the edge 122. To prevent the stop member 106 from pivoting about the pin 110 at this time, I provide an auxiliary means for locking this stop member into its dotted line position until such a time as the blade 121 is again drawn downward into the channel 105. This auxiliary means may conveniently be in the form of a latch 123 which is pivoted on a bolt 124 secured in a U-shaped frame 125 extending parallel to the longitudinal axis of the pit 20. This latch is resiliently held in engagement with one side of the blade 121 by means of a tension spring 126, one end of which is secured in an opening 127 of the latch 123, and the other end of which is hooked around a pin 128. Thus, when the blade 121 is moved upward a sufficient distance so that the latch 123 no longer engages therewith, this latch is moved into its position shown in Fig. 9 through the action of the spring 126. When in this position the tongue 115 of the stop member fits in a notch 129 formed in the latch 123, thus preventing any rotation of the stop member about the pin 110 until such time as the blade 121 again enters the channel 105 and engages an inclined surface 130 of the latch 123 to again move this latch into its position shown in Fig. 8.

The jack 119 may be of a construction similar to the jacks 50, if desired, but I prefer to utilize the form shown in Fig. 5 wherein the piston 120 is vertically slidable in a housing 135 to the interior of which is secured a pair of U-shaped spacer members 136, best shown in Figs. 5 and 6, the ends thereof being relatively spaced to form passages 137 on opposite sides of the piston 120, these spacing members journalling the piston as it slides vertically in the housing 135. The upper end of the piston 120 is sealed in fluid-tight relationship with the housing 135 by means of a packing 138 compressed against a packing-retaining ring 139 by means of a gland 140, the position of which may be adjusted by bolts 141 in the usual manner.

Welded to the interior of the housing 135 are guide members 142, 143, and 144, the latter two members cooperating with the member 142 in defining a vertical channel 145 in which a follower 146 secured to the piston 120 may vertically move. The guide members 143 and 144 are spaced so as to form a gate 148 between their ends and through which the follower 146 may snugly pass when entering the channel 145. This follower is of such size that it may pass through either of the passages 137, so that when the piston is being inserted, this follower first moves through one of these passages after which the piston is turned when the follower is moved opposite the gate 148. Once the follower is in the channel 145 the piston may move vertically in the shell without rotation about the axis thereof. The piston 120 is prevented from being moved too far upward by engagement between the follower 146 and the lower edge of one of the spacer members 136.

Referring particularly to Fig. 1, the jack 119 controls the operation of two auxiliary jacks 150 and 151, each of which provides a piston formed of an angle-iron structure 152 suitably journalled in a base 153 similar to the base 24 previously described, this journalling action taking place in a cap 154 secured thereto. Pivotally mounted in the base 153 of the jack 150 is a sheave 160 around which a flexible cable 161 passes, one end of this cable being secured to the lower end of the angle-iron structure 152, and the other end extending around a sheave 162 mounted in the base of the jack 119 and extending upward to a bar 163 secured to the piston 120. The auxiliary jack 151 is similarly connected to the jack 119 so that the pistons of these jacks simultaneously rise and lower.

The pistons of the auxiliary jacks 150 and 151 are provided with inclined blades similar to the blade 121 so that all of these blades simultaneously move upward with the length of pipe on the conveyor means 21 and raise this length of pipe therefrom, the pipe then rolling down the inclined surface of the blades and onto a secondary deck structure 170.

This secondary deck structure is in alignment with the primary deck structure, but is separated therefrom by a space 171 in which the conveyor means is positioned, it being understood that a conveyor element 22 is positioned between the jack 119 and each of the auxiliary jacks. The secondary deck structure 170 may be formed of I-beams, as indicated in Fig. 1, and may be inclined so that the lengths of pipe will roll downward therealong. If it is desired to stack a plurality of layers of these pipes, the secondary deck structure is filled with one layer of pipes, after which spacers 176, best shown in Fig. 1, are placed on top thereof and a new layer started. It is, of course, necessary for the jack 119 to move to successively higher elevations as the number of layers increases, but due to the latch means there is no danger of a new length of pipe being released by the loading means 100 even though the blade 121 moves upward a considerable distance.

It is desirable to be able to control the jacks 50 and 119 from a remote point, preferably from the head 16, and also to be able to individually raise and lower the jacks 50. The control system whereby these ends are accomplished is best illustrated in Fig. 10 wherein I have diagrammatically shown the jacks 50 and 119, one of the valve structures 80 being utilized for each jack. In addition, each of the jacks 50 is provided with an individual control valve 200 which is adapted to operate the valve structure associated therewith. For the purpose of distinction, I have termed the three jacks 50 with their associated valve structures 80 and control valves 200 as being primary, secondary, and tertiary jack structures 201, 202 and 203.

In Fig. 10, I have diagrammatically shown each individual control valve 200 as comprising a body 205 providing a cylinder 206 in which a piston 207 may be manually moved. The pipe 92 extending from the corresponding control valve structure 80 communicates with one end of this cylinder, while the pipe 93 communicates with the other, the piston 207 being of such length that when in a neutral position such as shown in the jack structure 201, this piston does not close the openings of these pipes. Axially aligned with the openings of the pipes 92 and 93 are pipes 208 and 209 which respectively communicate with the pipes 92 and 93 when the piston 207 is in its neutral position. When, however, the piston is moved to the left into a lifting position, in which the jack structure 202 is shown, this piston prevents communication between the pipe 209 and the pipe 93, and a port 210 thereof connects the pipe 93 with a discharge manifold 211 through a pipe 212. The outlet pipes 91 of all of the valve structures 80 are also connected to this outlet manifold as clearly shown, so that at this time water may be supplied from the pipe 208 through the right end of the cylinder 206 and the pipe 92, thus forcing the piston 86 of the corresponding jack structure leftward, the fluid on the left side of this piston 86 being discharged through the pipe 93, the pocket 210, and the pipe 212 to the outlet manifold 211, thus causing the pipe 89 to be put in communication with the pipe 79 through the pocket 87 of the piston 86, as previously described. This causes the jack corresponding to this jack structure to rise, water being supplied to the pipe 89 through an intake manifold 215. As soon as the piston 207 is moved into a neutral position, hydraulic pressure is again supplied to each end of the piston 86, thus causing this piston to assume its neutral position, and thus entrapping the water in the jack 50 in a manner to prevent the lowering of this jack.

When, however, it is desired to individually lower this jack, the piston 207 of the control valve 200 corresponding thereto is moved to the right into a position in which the jack structure 203 is shown. At this time, pressure is supplied to the left end of the piston 86 to move this piston rightward and force fluid through the pipe 92, the pocket 210, and the pipe 212, to the discharge manifold 211. The weight of the jack thus forces the previously entrapped liquid through the pipe 79, the port 87 of the piston 86, and the pipe 91 to the outlet manifold 212. It will thus be seen that any one of the jacks 50 may be individually operated by moving the piston 207 of the control valve associated therewith and that the jack may be stopped in any desired position. These control valves 200 are positioned in the pit 20 in positions adjacent their corresponding jacks, as clearly illustrated in Fig. 1, and the pistons 207 thereof are manually movable at the will of the operator.

In addition, it is desirable to be able to simultaneously operate the jacks 50 from the head 16 of the machine, and this is accomplished by a master control valve 230 similar to the individual control valves 200 and providing a cylinder in which a piston 231 is manually slidable. Opposite ends of this cylinder are connected to manifolds 232 and 233 to which the pipes 208 and 209 of each individual control valve are connected. An intake pipe 234 is connected to the intake manifold 215 and communicates with opposite ends of the cylinder at points aligned with the openings of the manifolds 232 and 233. When this piston 231 is in a neutral position shown in Fig. 10, pressure is supplied to both the manifolds 232 and 233 so that all of the valve structures 80 are maintained in neutral position. If, however, the piston 231 is moved upward, the pressure in the manifold 233 is maintained, while the pressure in the manifold 232 is vented through a pocket 236 which connects this manifold with a pipe 237 extending to the discharge manifold 211.

The pistons 86 of the valve structures 80 associated with the jacks 50 are thus simultaneously moved to the right, and these jacks simultaneously lower. Similarly, when the piston 231 is moved downward the pistons 86 simultaneously move to the left, thus causing the jacks to simultaneously rise. When the jacks are in the desired position, the pistons 207 and 231 are invariably returned to neutral position so that the jacks may be simultaneously operated from the head or individually operated from the individually controlled valves 200.

The jack 119 is provided with a valve structure 80 which is controlled from a control valve 250 mounted on the head and being formed similar to the master control valve 230. The valve 250 is connected to the valve structure 80 in a manner similar to that previously described. The operation of this valve effects the movement of the piston 86 of the valve structure associated therewith in a manner previously described, thus making it possible to raise and lower the jack 119 and its associated auxiliary jacks from the head of the machine.

The operation of the complete apparatus shown in Fig. 1 will now be described. Considering a length of pipe on the conveyor means adjacent the unloading means 101, this length of pipe having been processed, the operator raises the jack 119 and its associated auxiliary jacks by suitable manipulation of the control valve 250, the upward movement of this unloading means removing the length of pipe from the conveyor system and allowing it to roll onto the secondary jack structure 170. During this upward movement of the jack a new length of pipe rolls into the socket 109 of the stop member 106 and when the jack is again lowered this new length of pipe is released by the loading means 100 and rolls downward onto the conveyor means. The operator then starts the motor 42 by means of the switch 43 and the length of pipe moves successively along the conveyor elements 22 until it reaches a position substantially directly below the position indicated by the numeral 11 of Fig. 1. The motor is then shut off and the control valve 230 is manipulated so that the length of pipe is moved vertically upward into its primary position, this position being reached when the ring 77 of each jack 50 moves into the pocket 78 of the guide member 66. During this movement, the carriage is preferably disposed close to the head 16 so as not to interfere with the vertical movement of the pipe.

The carriage is then moved along the tracks in a manner to perforate the pipe. As the carriage comes adjacent any particular jack structure, the operator lowers this jack by manipulating the individual control valve 200 therewith associated until the carriage is moved therepast, after which this jack is again elevated by means of the valve 200. During the time that this jack is lowered the remaining jacks support the pipe in a correct position.

Subsequently the carriage is again moved adjacent the head 16 and the pipe lowered by manipulating the valve 230 in a manner to release the hydraulic pressure previously supplied to the jacks 50, thus again lowering the length of pipe into engagement with the conveyor elements. The motor 42 is now reversed and the length of pipe is moved outward until it lies adjacent the secondary deck means 170 after which the operator operates the valve 250 to raise the jack 119 and roll this length of pipe from the conveyor means to the secondary deck structure. When the jack 119 is subsequently lowered, a new length of pipe rolls onto the conveyor means due to the interconnection between the blade 121 and the stop member 106.

The jack control means of my invention, including the valve structures 80 and the individual and master control valves are important details of the present invention, although not limited thereto in usefulness. I have found it impractical to attempt to maintain the jacks 50 in raised position by hydraulic means acting directly on the pistons thereof when in raised position. In this event when one jack is individually lowered and subsequently again raised the flow of water thereto lowers the pressure on the other jacks to such an extent that there is danger of the pistons of these other jacks momentarily lowering, thus causing damage to the machine. For this reason the present system is designed to entrap a body of water in each of the jacks, thus preventing any decrease in pressure in the intake manifold 215 from lowering the pressure effected in holding the jacks in an upward position. It should be understood, however, that I am not limited to the particular form of individually controlled valves or master control valves shown in Fig. 10, this type of valve being shown only for convenience. Other types of valves such as a rotary D valve may also be used without departing from the spirit of my invention.

It should be understood that my invention is not limited to the complete combination shown, but that certain subcombinations thereof find utility in various arts. So also, various changes and modifications may be made without departing from the spirit of my invention.

I claim as my invention:

1. In combination with a machine for processing a length of material when positioned at a primary level, the combination of: a plurality of spaced conveyor elements for advancing said length of material toward said machine at a secondary level below said primary level; and a plurality of jacks for raising said length of material from said secondary level to said primary level, each of said jacks being positioned between adjacent conveyor elements.

2. A combination as defined in claim 1 including a reversible drive means connected to each of said conveyor elements for simultaneously rotating these elements.

3. A combination as defined in claim 1 in which each of said conveyor elements comprises a pair of juxtaposed wheels, and including tires on said wheels on which said length of material rests.

4. In combination with a machine for processing a length of material, and a pit formed below the floor level and extending toward the machine, the combination of: a plurality of conveyor elements rotatably mounted in said pit; and a plurality of jacks movable upward through the path of travel of said length of material when being moved along said conveyor elements for raising said length of material to a position above said floor level.

5. In combination: a primary sloping deck means adapted to retain a plurality of circular lengths of material movable therealong by the action of gravity; a secondary deck means adjacent the lower end of said primary deck means, there being a space between said deck means; means for moving said lengths of material one by one into said space; and jack means movable in said space for moving said lengths of material onto said secondary deck.

6. In combination: a primary sloping deck means adapted to retain a plurality of circular lengths of material movable therealong by the action of gravity; a secondary deck means adjacent the lower end of said primary deck means, there being a space between said deck means; stop means for rolling said lengths of material one at a time into said space; and jack means movable in said space and operatively interconnected with said stop means for moving each length of material from said space before another enters therein.

7. In combination: a primary sloping deck means adapted to retain a plurality of circular lengths of material movable therealong by the action of gravity; a secondary deck means adjacent the lower end of said primary deck means, there being a space between said deck means; a movable stop means adapted when in one position to retain said lengths of material from rolling on said primary deck means and when in another position to allow one of said lengths to roll into said space; and jack means movable in the path of travel of said stop means in a manner to actuate same, said jack means moving said length of material from said space and onto said secondary deck means.

8. In combination: a primary sloping deck means adapted to retain a plurality of circular lengths of material movable therealong by the action of gravity; a stop member providing a heel and a head; means for pivoting said stop member to said deck means at a section between said heel and said head whereby said heel and said head may be alternately movable into the path of travel of said lengths of material; jack means engaging said stop member for pivoting same; and a latch means engageable with said stop member and releasable by a movement of said jack means.

9. In combination: a primary sloping deck means adapted to retain a plurality of circular lengths of material movable therealong by the action of gravity; a stop member providing a heel, a head, and a tongue; means for pivotally mounting said stop member so that said heel and said head may be alternately raised above said deck means; a catch means adapted to engage said tongue when said head is above said deck means; and means engageable with both said catch means and said stop member for controlling the movement thereof.

10. In combination with a machine for processing a length of material when positioned at a primary level, the combination of: conveyor means for advancing said length of material toward said machine at a secondary level below said primary level; and a plurality of jacks for elevating said length of material to said primary level and supporting said length of material during the processing thereof.

11. In combination with a machine for processing a length of material when positioned at a predetermined level, the combination of: conveyor means disposed below the level of said machine for advancing said length of material toward said machine; a plurality of jacks for elevating said length of material to the level of said machine; and means for simultaneously and individually controlling the operation of the said jacks.

12. In combination with a machine for processing a length of material when positioned at a predetermined level, the combination of: a conveyor for advancing said length of material toward said machine below said level; a plurality of jacks for raising said length of material from said lower level to said predetermined level; operating means for operating said jacks; and a reversible drive means connected to said conveyor for driving the same.

13. A combination as defined in claim 10 in which said conveyor comprises a plurality of pairs of juxtaposed wheels.

14. A combination as defined in claim 12 in which said conveyor comprises a plurality of pairs of spaced apart wheels, and including tires on said wheels which support said length of material.

15. A combination as defined in claim 12 including means for individually lowering a jack to permit the passage of a portion of the machine thereover.

16. In combination with a machine for processing a length of material when positioned at a primary level, the combination of: a plurality of spaced conveyor elements for advancing said length of material toward said machine at a secondary level below said primary level; a plurality of jacks for raising said length of material from said secondary level to said primary level; and means for individually lowering said jacks to permit passage of a portion of said machine.

17. In combination with a machine for processing a length of material when positioned at a primary level, the combination of: a plurality of spaced conveyor elements for advancing said length of material toward said machine at a secondary level below said primary level; a plurality of jacks for raising said length of material from said secondary level to said primary level; and means for simultaneously and individually controlling the lifting of said jacks.

18. In combination with a machine for processing a length of material when positioned at a primary level, the combination of: a plurality of spaced conveyor elements for advancing said length of material toward said machine at a secondary level below said primary level; a plurality of jacks for raising said length of material from said secondary level to said primary level; means for simultaneously and individually controlling the lifting of said jacks; and means for individually lowering said jacks to permit passage of a portion of said machine thereover.

19. In combination: a plurality of jacks for supporting a length of material; a carriage adapted to move along said material; and means for lowering from the path of travel of said carriage any of said jack means when said carriage reaches that portion of said material supported thereby, said means controlling the subsequent reraising thereof when said carriage is moved therepast.

In testimony whereof, I have hereunto set my hand at Los Angeles, California, this 28th day of January, 1930.

CLARENCE J. COBERLY.